Patented Oct. 11, 1938

2,132,396

UNITED STATES PATENT OFFICE 2,132,396

BAKED GOODS AND METHOD OF MAKING SAME

Herbert S. Coith, Albert S. Richardson, and Verling M. Votaw, Wyoming, Ohio, assignors to The Procter & Gamble Company, Cincinnati, Ohio, a corporation of Ohio No Drawing. Application February 4, 1933, Serial No. 655,295

41 Claims. (Cl. 99—92)

Our invention relates to cakes and other baked products containing flour, sugar, and shortening, and to the process of making same.

The main object of our invention is to produce sweet baked goods of improved appearance and eating qualities, particularly with respect to a uniformly light and tender texture. This object will be more clearly understood by reference to the qualities desirable in sweet baked products, especially cakes. Moistness, sweetness, and tenderness are highly prized in cakes and are obtained in increasing degree as the ratio of sugar to flour is increased and moisture is added. However, as these changes in the cake formula are made, the finished cake becomes smaller in volume, and heavier in texture, until a point is reached when the cake falls at the end of baking and is thus "sad" and a complete failure. Because of this tendency of the cake to fall, the amount of sugar in commercial cakes under present practice is on the average limited to less than the weight of flour present, notwithstanding the fact that more sugar and along with it more moisture would be advantageous from the standpoint of the best eating and keeping qualities of the cake. It is the principal object of our invention to overcome, or in large measure to counteract, this tendency of cakes to fall as the ratio of sugar to flour and the moisture content are increased, and to make possible ratios of sugar to flour and amounts of moisture materially greater than the maximum possible in present practice, without sacrifice of the light texture which is essential.

Another object of our invention is to secure greater tolerance for the various grades and qualities of flour in cake making. The known differences among the various commercial grades of flour for the purpose of making cake of good volume and texture are still discernible when our invention is practiced, but the improvement obtained is particularly striking for the lower grades of flour and it thus becomes possible to make satisfactory cakes of light, tender texture with grades of flour heretofore considered unsuitable for cake making.

While our invention is especially advantageous when applied to cakes of high sugar content, it is also distinctly useful as applied generally to baked products containing flour, sugar and shortening, on account of the light, tender texture of such products when made according to our invention.

Incidental advantages of our invention result from the fact that the cake batter produced is softer than that made by the ordinary procedure; our cake batter spreads itself readily in the cake pan, and is baked into a cake having an unusually soft, smooth, and moist eating quality.

We have found that the objects set forth are attained if at some point in the mixing of the dough or batter to be baked there is introduced a suitable quantity of special fat, containing combined glycerin in excess of that occurring in natural fats and commercial shortenings heretofore available. When such a special fat is thus incorporated in the mixture, the texture of sweet baked products is improved, being in general lighter and more uniform, and the ratio of sugar to flour and the moisture content of cakes may be greatly increased over ordinary practice without undue tendency of the cake to fall. With the practice of our invention, as much as 150% to 175% sugar on the basis of flour may be successfully incorporated in the cake mixture, and the proportions of milk and other liquid constituents also increased. These changes result in cakes of unusually fine texture, flavor, and keeping quality. The cost of the cake is at the same time reduced, on account of the relatively greater proportion of sugar and moisture present.

The most effective special fat for use in small quantities in the practice of our invention is monoglyceride, containing one mol. of combined glycerin to each mol. of combined fatty acid. Diglyceride containing one mol. of combined glycerin to two mols combined fatty acid, also gives excellent results, but about three or four times as much should be used as in the case of monoglyceride. Excellent results are obtained by the use, for instance, of .3% to .6% monoglyceride, or of 1% to 2.5% diglyceride, based on the total cake mixture.

Fats and fatty oils containing excess of combined glycerin over that in triglyceride, whether in the form of monoglyceride or diglyceride or both, may collectively be termed superglycerinated fat. The degree of superglycerination of the special fat used in the practice of our invention may vary from the full excess of glycerin present in monoglyceride to the very small excess of glycerin required to yield a fat consisting predominantly of triglyceride but containing an appreciable percentage of diglyceride.

In making sweet baked goods according to the present invention, superglycerinated fat, depending upon the excess of combined glycerin which it contains, replaces varying proportions of the usual shortening—from 100% down to 2% or even less, usually between 4% and 14%.

For instance, .04 pound of a typical monoglyceride incorporated along with each pound of total shortening produces a result roughly equivalent to .14 pound of the corresponding diglyceride per pound of total shortening, and about the same result may be obtained if, instead of using a concentrated form of superglycerinated fat, the shortening as a whole is prepared in such a way as to contain about 0.6% more combined glycerin than would normally be present in triglyceride shortening from the same source of fat.

In the practice of our invention in its preferred form, the quantity of superglycerinated fat used is such that the excess of combined glycerin (over, that required for triglyceride formation, i. e., formation of the triglyceride of all the fatty acid in the superglycerinated fat) is between 0.3% and 1.5% of the weight of the total shortening used. However, we do not limit ourselves to this exact range, since appreciable improvement in texture of sweet baked goods can be obtained below this preferred range, and excellent results are obtained above this range. In the extreme case, we have replaced all of the ordinary shortening used in the dough or batter with a fat consisting essentially of monoglyceride and hence having about 15% more combined glycerin than required for triglyceride formation; while this procedure results in a baked product of unusually fine, light texture, it is not the most economical method of practicing our invention and is not especially recommeded.

Preparation of the superglycerinated fat does not constitute a part of the present invention. It may be prepared, according to known methods, by combining glycerin directly with triglycerides or by combining fatty acid with a suitable proportion of glycerin. For instance, if a triglyceride shortening such as partially hydrogenated cottonseed oil of about 70 iodine value is agitated at about 240° C. with about 10% its weight of glycerin, reaction between the triglyceride and glycerin occurs. If the reaction is interrupted after about one hour, the upper layer is a superglycerinated fat (estimated to contain roughly 10% diglyceride) suitable for use in our invention, if it replaces all or the major part of the usual shortening in the dough or batter. If reaction continues for a longer time under the conditions stated, the proportion of combined glycerin increases and the synthetic fat eventually consists chiefly of diglyceride and may be used to supplement the usual shortening or to replace a minor fraction of it. Also special methods of forming monoglycerides and diglycerides by direct reaction of glycerin and triglyceride are known in the prior art, and procedures for preparing superglycerinated fat by esterifying fatty acids with glycerin are well-known and readily found in the literature.

We prefer to use superglycerinated fat derived from predominantly unsaturated fatty acids of molecular formula containing 16 or more carbon atoms. For example, among the suitable fat sources for the preparation of our superglycerinated fat are the following: edible vegetable oils, especially olive, cottonseed, sesame, and peanut oils; partially hydrogenated fatty oils such as cottonseed, sesame, peanut, corn, soybean, whale and pilchard oils, especially hydrogenated oils in the range 60 to 80 iodine value; and edible animal fats such as lard and beef tallow. Superglycerinated fat may be prepared by combining glycerin either with the free fatty acids liberated from any of the foregoing or a similar fat, or with the triglyceride itself. The monoglyceride and diglyceride mixtures thus prepared are of soft or liquid consistency, and may be used to replace 2% or more of the conventional plastic triglyceride shortening without substantially stiffening or otherwise changing its consistency; such mixtures, which are more fully set forth in our copending application Serial No. 655,292, filed concurrently herewith, are very suitable for use in the practice of the present invention.

Oils of the coconut type are preferably not used in substantial proportion in the preparation of our superglycerinated fat. The monoglyceride of coconut fatty acids is inferior in flavor to most superglycerinated fats.

Because of superior resistance to rancidity or for some other special reason, it may sometimes be desirable to prepare the superglycerinated fat required for the practice of our invention chiefly from the higher saturated fatty acids like palmitic and stearic. For instance, a suitable source of such fatty acids would be any of the above named oils, other than coconut oil, after almost complete hydrogenation. If our superglycerinated fat is thus derived chiefly from the higher saturated fatty acids, it contains perferably enough monoglyceride to bring the combined glycerin content to about 19% or more. While we may readily compensate for the lower efficiency of diolein as compared with monolein by using more of the former, we have not found any larger quantity of fat of the distearin type to be a practical equivalent of fat of the monostearin type in sweet baked goods. As convenient means of incorporating hard fat of the monoglyceride type in our cake mixes, we may premix the solid fat with flour as more fully set forth in our copending application Serial No. 655,294, filed concurrently herewith, or we may premix the solid monoglyceride with a larger quantity of a softer fat such as cottonseed oil, thereby forming a highly efficient plastic shortening as more fully set forth in our copending application Serial No. 655,293, filed concurrently herewith.

We find that to obtain the best quality in cake or other baked goods made according to this invention it may be necessary to adjust the quantity of free fatty acid incorporated in the mix. Whether such free fatty acid is added separately or is merely a part of the shortening used, the total amount of free fatty acid is preferably between .13% and 4% of the shortening used. We have found that the same improved result may be obtained by the use of a quantity of soap about the same as the quantity of free fatty acid mentioned above. Combinations of free fatty acid and soap are also effective. Any added free fatty acid or soap, of course, should be carefully prepared from fat of edible grade, for instance, from any of the fats already mentioned as affording satisfactory fat sources for the preparation of our superglycerinated fat.

Our invention is useful mainly but not exclusively as applied to sweet baked products containing a chemical leavening agent.

The increase in volume in the leavened cake resulting from the use of superglycerinated fat averages between 10 and 20%, with a corresponding increase in lightness. In obtaining this advantage, the superglycerinated fat appears to act as a supplement to the leavening material. This leavening agent raises the cake while in the oven to a considerably larger volume than is possessed by the finished and cooled cake, but the extra volume is usually lost during the last few minutes in the oven as the cake is setting. The superglycerinated fat apparently strengthens the cell structure of the cake, for we find that a large part of the volume usually lost in this setting period is retained in the finished cake made according to our process.

In the examples which follow, the superglycerinated fat in concentrated form is added as a separate ingredient to the mixture to be baked. We have found the procedures described to give excellent results. However, the required quantity of superglycerinated fat may also be premixed with the whole shortening or with any of the other constituents of the cake, according to convenience of operation, and may be introduced at practically any point prior to the final mixing of the whole batch. Prepared flours containing superglycerinated fat are not claimed in the present application, but are described and claimed in our copending application Serial No. 655,294, filed concurrently herewith. Also no claim is made in the present application to shortenings as such, but several special shortenings containing superglycerinated fat are described in greater detail and claimed in our copending applications, Serial Nos. 655,292 and 655,293, also filed concurrently herewith.

Example 1

The following is a formula and mixing procedure for a white layer cake of high sugar content. The superglycerinated fat is derived from hydrogenated cottonseed oil of about 70 iodine value and is predominantly diglyceride.

|  | Lbs. | Ozs. |
|---|---|---|
| Sugar | 1 | 7 |
| Salt |  | ½ |
| Shortening |  | 6⅓ |
| Superglycerinated fat |  | 1 |
| Milk |  | 1 |
| Vanilla |  | ¼ |
| Cake flour | 1 |  |
| Baking powder |  | ¾ |
| Egg whites |  | 10 |

All of the ingredients except the egg whites are put in the bowl of a mixing machine, e. g., a Hobart mixer, and mixed for 10 minutes at low speed. The egg whites are added and the mixing continued at low speed for 10 minutes. Baking is carried out at 375° F. in layer cake pans. The cake made from this formula without the superglycerinated fat usually falls badly and has about 20% less volume than when our invention is practiced.

Example 2

The following is a formula for a white layer cake of moderate sugar content. The superglycerinated fat is derived from hydrogenated cottonseed oil of about 70 iodine value and is predominantly monoglyceride.

|  | Lbs. | Ozs. |
|---|---|---|
| Sugar |  | 13½ |
| Salt |  | ⅓ |
| Shortening |  | 7 |
| Superglycerinated fat |  | ⅓ |
| Egg whites |  | 14 |
| Milk |  | 2 |
| Vanilla |  | ¼ |
| Baking powder |  | ⅓ |
| Cake flour | 1 |  |

The first four ingredients are creamed together for 5 minutes at medium speed in a Hobart or similar mixing machine. The egg whites are added slowly during the next 2½ minutes, and creaming continued for 5 minutes after the eggs are in. The last four ingredients are then added to the batter, and mixing continued for 3 minutes at low speed. Baking is carried out at 375° F.

The practice of our invention in this case produces a cake having about 17% more volume than would be obtained by the ordinary procedure.

Example 3

Following is a formula for sugar cookies. The monoglyceride is the same as used in Example 2.

|  | Lbs. | Ozs. |
|---|---|---|
| Sugar | 3 |  |
| Superglycerinated fat |  | ⅔ |
| Shortening | 1 |  |
| Salt |  | ½ |
| Mace |  | ¼ |
| Eggs |  | 12 |
| Glucose |  | 4 |
| Milk |  | 8 |
| Soda |  | ½ |
| Ammonium bicarbonate |  | 1¼ |
| Vanilla |  | ½ |
| Cake flour | 6 |  |

The sugar, shortening, superglycerinated fat, salt and spice are creamed together lightly. The eggs are added gradually while creaming, then the glucose. The ammonium bicarbonate is dissolved in the milk, which is next stirred into the mass. The flour and soda, sifted together, are then added along with the vanilla. When the mix is smooth, it is rolled out, cut with a cookie cutter, and baked in the usual way.

The superglycerinated fat in the above examples can be varied widely without substantially affecting the practical results obtained, in accordance with the general description of our invention already set forth. For instance, in Example 1 the ordinary shortening may be increased by ½ oz. and the superglycerinated fat in the formula changed to ½ oz. of a mixture of monoglyceride and diglyceride prepared by esterifying peanut oil or cottonseed oil fatty acids with sufficient glycerin to give about 20% combined glycerin in the reaction mixture. Again in Examples 2 and 3 the superglycerinated fat may be prepared from numerous other sources, such as hydrogenated sesame oil, hydrogenated pilchard oil, or lard.

It should be understood that in the present specification and claims we use the word "fat" not only to designate the common edible fats and fatty oils, such as cottonseed oil, coconut oil, lard or butter fat, which for their shortening action depend almost wholly upon their content of triglyceride of fatty acids, but also to designate mono- and diglycerides of similar fatty acids or mixtures of these various glycerides with or without a small proportion of free fatty acid or soap, where the additive effect of the several agents is sufficient for the purposes of the instant invention.

Having thus described the invention, what is claimed as new and desired to be secured by Letters Patent is:

1. In the process of making baked goods containing flour and more sugar than flour, the step which consists in incorporating in the mix fat comprising glycerides of the group consisting of monoglycerides and diglycerides of higher fatty acids in quantity sufficient to effect appreciable reduction of shrinkage on cooling after baking.

2. In the process of making baked goods containing flour and more sugar than flour, the step which consists in adding as a constituent of the mix fat comprising at least 2% predominantly unsaturated glycerides of higher fatty acids characterized by combined glycerin content in excess of that required for triglyceride formation.

3. In the process of making baked goods containing more sugar than flour, the step which consists in adding fat comprising higher fatty acid monoglyceride as a constituent of the mix, the quantity of monoglyceride being at least about .3% of the weight of the mix.

4. In the process of making baked goods containing more sugar than flour, the step which consists in adding fat comprising predominantly unsaturated higher fatty acid diglyceride as a constituent of the mix, the quantity of said diglyceride being at least about 1% of the weight of the mix.

5. In the process of making baked goods containing more sugar than flour, the step which consists in adding as a constituent of the mix fat comprising glycerides of the group consisting of monoglycerides and diglycerides of higher fatty acids, and also in adding a small quantity of free fatty acid.

6. In the process of making baked goods containing more sugar than flour, the step which consists in adding as a constituent of the mix fat comprising glycerides of the group consisting of monoglycerides and diglycerides of higher fatty acids, and also in adding a small quantity of soap.

7. In the process of making baked goods containing flour, more sugar than flour, shortening, and a leavening agent, the step which consists in adding as a constituent of the mix a fat characterized by combined glycerin content in excess of that occurring in ordinary triglyceride.

8. In the process of making baked goods containing flour, more sugar than flour, shortening, and a leavening agent, the step which consists in adding as a constituent of the mix a fat characterized by combined glycerin content in excess of that required for triglyceride formation, and also in adding a small quantity of free fatty acid.

9. In the process of making baked goods containing flour, more sugar than flour, shortening, and a leavening agent, the step which consists in adding as a constituent of the mix a fat characterized by combining glycerin content in excess of that required for triglyceride formation, and also in adding a small quantity of soap.

10. In the process of making baked goods containing flour, more sugar than flour, and shortening, the step which consists in adding as a constituent of the mix a fat characterized by combined glycerin content in excess of that required for triglyceride formation, said excess of combined glycerin being between 0.3 and 1.5% of the total weight of shortening.

11. The process of making sweet baked goods which comprises mixing flour, shortening, leavening agent, eggs, milk, and sugar, the mount of sugar exceeding the amount of flour, and incorporating in the mix fat comprising at least 2% glycerides belonging to the group consisting of monoglycerides and diglycerides of higher fatty acids.

12. The process of making sweet baked goods which comprises mixing flour, shortening, leavening agent, eggs, milk, and sugar, the amount of sugar exceeding the amount of flour, and incorporating in the mix fat comprising glycerides of higher fatty acids containing an excess of combined glycerin over that required for triglyceride formation, said excess of combined glycerin being not less than 0.3% of the weight of total shortening in the mix.

13. The process of making sweet baked goods which comprises mixing flour, shortening, leavening agent, eggs, milk, and sugar, the amount of sugar exceeding the amount of flour, and incorporating in the mix fat comprising at least 2% glycerides of the group consisting of monoglycerides and diglycerides of predominantly unsaturated fatty acids of molecular formula containing at least 16 carbon atoms.

14. The process of making sweet baked goods which comprises mixing flour, shortening, leavening agent, eggs, milk, and sugar, the amount of sugar exceeding the amount of flour, and incorporating in the mix fat comprising at least 2% glycerides belonging to the group consisting of monoglycerides and diglycerides of partially hydrogenated fatty oil.

15. The process of making sweet baked goods which comprises mixing flour, shortening, leavening agent, eggs, milk, and sugar, the amount of sugar exceeding the amount of flour, and incorporating in the mix fat comprising at least 2% glycerides of the group consisting of monoglycerides and diglycerides of hydrogenated cottonseed oil.

16. In the process of making cakes containing flour, shortening, chemical leavening agent, and an amount of sugar exceeding the amount of flour, the step which consists in incorporating in the mix synthetic fatty acid glycerides belonging to the group consisting of monoglycerides and diglycerides of higher fatty acids in quantity sufficient to effect appreciable reduction in the amount of shrinkage of the cake after baking and cooling.

17. In the process of making cakes containing more sugar than flour, the step which consists in adding as a constituent of the mix fat characterized by combined glycerin content in excess of that required for triglyceride formation, said excess of combined glycerin being not less than 0.3% of the total weight of fat in the mix.

18. Sweet baked goods containing more sugar than flour and containing synthetic fat characterized by a combined glycerin content in excess of that required for triglyceride formation, said excess of glycerin being between 0.3% and 1.5% of the weight of all the fat present.

19. Cakes containing more sugar than flour and containing fat characterized by a combined glycerin content at least 0.3% in excess of that occurring in ordinary triglyceride.

20. Cakes containing more sugar than flour and containing synthetic fat characterized by a combined glycerin content in excess of that required for triglyceride formation, said excess of glycerin being between 0.3% and 1.5% of the weight of all the fat present.

21. Cakes containing more sugar than flour and containing between 0.3% and 0.6% of synthetic fat consisting predominantly of higher fatty acid monoglyceride.

22. Sweet baked goods of the character containing more sugar than flour and employing shortening comprising triglycerides of fatty acids, characterized by the replacement of an amount of the triglyceride ranging from 2% to 100% with superglycerinated fat.

23. Cakes of the character containing more sugar than flour and employing shortening comprising triglycerides of fatty acids, characterized by the replacement of an amount of the triglyceride ranging from 4% to 12% with synthetic fat comprising predominantly glycerides of the group consisting of monoglycerides and diglycerides of higher fatty acids.

24. A process for reducing shrinkage after baking in sweet baked goods containing more sugar than flour which comprises incorporating in the mix glycerides of the group consisting of monoglycerides and diglycerides of higher fatty acids.

25. In the process of making cakes containing flour and more sugar than flour, the step which consists in mixing with at least one of the cake constituents, prior to the final mixing, fat comprising glycerides selected from the group consisting of monoglycerides and diglycerides of higher fatty acids in quantity sufficient to effect appreciable reduction of shrinkage on cooling after baking.

26. The process of making sweet baked goods which comprises mixing flour, shortening, leavening agent, eggs, milk, and sugar, the amount of sugar exceeding the amount of flour, and incorporating with at least one of the constituents of the mix, prior to the final mixing, fat comprising at least 2% of glycerides belonging to the group consisting of monoglycerides and diglycerides of higher fatty acids.

27. In the process of making baked goods containing sugar and flour, the ratio of sugar to flour being sufficiently high to cause material shrinkage on cooling after baking in the absence of a shrinkage reducing agent, the step which consists in incorporating in the mix shortening comprising glycerides of the group consisting of monoglycerides and diglycerides of higher fatty acids in quantity sufficient to secure an increased volume of not less than about 10% over similar goods containing ordinary shortening of the triglyceride type.

28. Sweet baked goods containing sugar and flour, the ratio of sugar to flour being sufficiently high to cause material shrinkage on cooling after baking in the absence of a shrinkage reducing agent, and containing fat characterized by a combined glycerin content sufficiently in excess of that occurring in ordinary triglyceride to secure an increased volume having a minimum of about 10% over similar goods containing ordinary shortening of the triglyceride type.

29. Sweet baked goods containing flour and more sugar than flour and containing fat characterized by a combined glycerin content sufficiently in excess of that occurring in ordinary triglyceride to effect substantial increase in the volume of the finished product as compared with baked goods otherwise similar but containing triglyceride fat lacking in such excess of combined glycerin.

30. In the process of making cakes containing flour and sugar, the step which consists in mixing into the cake batter plastic shortening consisting essentially of fatty acid glycerides containing combined glycerin in excess of that required for triglyceride formation, said excess of combined glycerin being not less than .3% of the weight of total fat and being present predominantly in the form of synthetic fat selected from the group consisting of monoglycerides of higher fatty acids and diglycerides of unsaturated higher fatty acids.

31. The process claimed in claim 30, in which the plastic fat consists of a blend of fat of the triglyceride type with 4% to 14% synthetic fat.

32. The process claimed in claim 30, in which the plastic fat is prepared by embodying in triglycerides from natural source at least 4% predominantly unsaturated higher fatty acids esterified with a proportion of glycerin greater than that required for triglyceride formation.

33. The process claimed in claim 30, in which the plastic fat consists essentially of a predominating proportion of a softer fat of the triglyceride type mixed with and stiffened by not less than about 4% hard fat containing at least 19% glycerin esterified with predominantly saturated higher fatty acids.

34. The process claimed in claim 30, in which the plastic fat as added to the batter is a substantially dry mixture of glycerides.

35. The process of making cakes from a batter containing flour, much more sugar than flour, shortening and a leavening agent, which comprises replacing up to 2% of the ordinary triglyceride shortening with monoglyceride of higher fatty acid, the amount of said monoglyceride being sufficient to decrease appreciably the shrinkage of the cakes at the end of baking.

36. Cakes formed from a batter containing flour, much more sugar than flour, and containing shortening in which up to about 2% of the usual triglyceride shortening is replaced by monoglyceride of higher fatty acid, said monoglyceride being sufficient in amount to effect appreciable increase in the volume of the finished cake as compared with cakes otherwise similar but containing only conventional triglyceride shortening.

37. The process of making white cake which comprises mixing flour, shortening, leavening agent, white only of egg, milk, and sugar, the amount of sugar exceeding the amount of flour, and incorporating in the mix fat comprising at least 2% glycerides belonging to the group consisting of monoglycerides and diglycerides of higher fatty acids.

38. The process of making white cake which comprises mixing flour, shortening, leavening agent, white only of egg, milk, and sugar, the amount of sugar exceeding the amount of flour, and incorporating in the mix fat comprising glycerides of higher fatty acids containing an excess of combined glycerin over that required for triglyceride formation, said excess of combined glycerin being not less than 0.3% of the weight of total shortening in the mix.

39. In the process of making white cake containing shortening, a leavening agent, white only of egg, sugar, and flour, the ratio of sugar to flour being sufficiently high to cause material shrinkage on cooling after baking in the absence of a shrinkage reducing agent, the step which consists in incorporating in the mix shortening comprising glycerides of the group consisting of monoglycerides and diglycerides of higher fatty acids in quantity sufficient to secure an increased volume of not less than about 10% over similar cake containing ordinary shortening of the triglyceride type.

40. White cake containing shortening, a leavening agent, white only of egg, sugar, and flour, the ratio of sugar to flour being sufficiently high to cause material shrinkage on cooling after baking in the absence of a shrinkage reducing agent, and containing fat characterized by a combined glycerin content sufficiently in excess of that occurring in ordinary triglyceride to secure an increased volume having a minimum of about 10% over similar goods containing ordinary shortening of the triglyceride type.

41. In the process of making white cake containing a leavening agent, egg white only, shortening, flour, and sugar, the step which consists in mixing into the cake batter dry plastic shortening consisting essentially of fatty acid glycerides containing combined glycerin in excess of that required for triglyceride formation, said excess of combined glycerin being not less than .3% of the weight of total fat and being present predominantly in the form of synthetic fat selected from the group consisting of monoglycerides of higher fatty acids and diglycerides of unsaturated higher fatty acids.

HERBERT S. COITH.
ALBERT S. RICHARDSON.
VERLING M. VOTAW.